(12) United States Patent
Zeng et al.

(10) Patent No.: US 9,696,723 B2
(45) Date of Patent: Jul. 4, 2017

(54) SMART TRAILER HITCH CONTROL USING HMI ASSISTED VISUAL SERVOING

(71) Applicant: GM GLOBAL TECHNOLOGY OPERATIONS LLC, Detroit, MI (US)

(72) Inventors: Shuqing Zeng, Sterling Heights, MI (US); Wei Tong, Troy, MI (US); Jinsong Wang, Troy, MI (US); Wende Zhang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/747,888

(22) Filed: Jun. 23, 2015

(65) Prior Publication Data

US 2016/0378118 A1    Dec. 29, 2016

(51) Int. Cl.
*B60D 1/36* (2006.01)
*G05D 1/02* (2006.01)
*B62D 13/00* (2006.01)
*B60R 1/00* (2006.01)
*B60D 1/62* (2006.01)

(52) U.S. Cl.
CPC .............. *G05D 1/0246* (2013.01); *B60D 1/36* (2013.01); *B60D 1/62* (2013.01); *B60R 1/00* (2013.01); *B62D 13/00* (2013.01); *G05D 1/0212* (2013.01); *B60R 2300/202* (2013.01); *B60R 2300/808* (2013.01)

(58) Field of Classification Search
CPC ........ G05D 1/0246; B60D 1/36; B60Q 1/484; G01S 13/86; B60T 8/1708; B60R 1/00; B60W 30/12; G06K 9/00805

USPC ................ 701/28, 37, 42, 70, 445; 208/477; 340/435
See application file for complete search history.

(56) References Cited

U.S. PATENT DOCUMENTS

| 5,485,384 A * | 1/1996 | Falconnet ............... G01S 13/86 342/25 A |
| 7,777,615 B2 * | 8/2010 | Okuda ..................... B60D 1/36 280/477 |
| 8,191,915 B2 * | 6/2012 | Freese ..................... B60D 1/36 180/167 |
| 8,888,121 B2 * | 11/2014 | Trevino ................... B60D 1/36 280/477 |
| 2003/0047909 A1 * | 3/2003 | Alger ...................... B60D 1/36 280/477 |

(Continued)

*Primary Examiner* — Yuri Kan
(74) *Attorney, Agent, or Firm* — John A. Miller; Miller IP Group, PLC (57) ABSTRACT

A method for autonomously aligning a tow hitch ball on a towing vehicle and a trailer drawbar on a trailer through a human-machine interface (HMI) assisted visual servoing process. The method includes providing rearview images from a rearview camera. The method includes touching the tow ball on a display to register a location of the tow ball in the image and touching the drawbar on the display to register a location of a target where the tow ball will be properly aligned with the drawbar. The method provides a template pattern around the target on the image and autonomously moves the vehicle so that the tow ball moves towards the target. The method predicts a new location of the target as the vehicle moves and identifies the target in new images as the vehicle moves by comparing the previous template pattern with an image patch around the predicted location.

19 Claims, 5 Drawing Sheets

(56) References Cited

U.S. PATENT DOCUMENTS

| | | | |
|---|---|---|---|
| 2008/0231701 A1* | 9/2008 | Greenwood | B60R 1/00 348/148 |
| 2009/0091436 A1* | 4/2009 | Anderson | B60R 1/00 340/435 |
| 2011/0202240 A1* | 8/2011 | Rottner | B60Q 1/484 701/42 |
| 2013/0314503 A1* | 11/2013 | Nix | G06K 9/00805 348/46 |
| 2015/0057903 A1* | 2/2015 | Rhode | B60T 8/1708 701/70 |
| 2015/0115571 A1 | 4/2015 | Zhang et al. | |
| 2015/0166062 A1* | 6/2015 | Johnson | B60W 30/12 701/41 |
| 2016/0052548 A1* | 2/2016 | Singh | B60D 1/36 701/37 |

\* cited by examiner

SMART TRAILER HITCH CONTROL USING HMI ASSISTED VISUAL SERVOING

BACKGROUND OF THE INVENTION

Field of the Invention

This invention relates generally to a system and method for aligning a tow hitch ball and a trailer drawbar and, more particularly, to a system and method for autonomously aligning a tow hitch ball on a towing vehicle and a trailer drawbar on a trailer through a human-machine interface (HMI) assisted visual servoing process.

Discussion of the Related Art

Some vehicles are equipped with a tow hitch that allows a trailer or other towed vehicle to be coupled thereto so that the towing vehicle can tow the trailer. Generally, the trailer hitch is mounted to a rear support structure of the towing vehicle proximate the vehicle's rear bumper, and includes a tow hitch ball having a certain diameter. The towed vehicle typically includes a trailer drawbar that extends from a front end of the towed vehicle. The trailer drawbar often includes a cup in which the hitch ball is positioned to couple the hitch to the trailer drawbar. A securing mechanism within the cup, such as a metal flap, is selectively positioned around the ball when it is inserted in the cup to securely hold the drawbar to the hitch.

When the towed vehicle is detached from the towing vehicle, the trailer drawbar is generally supported on a height adjustable stand so that the cup is positioned higher above the ground than the ball of the hitch. When the operator of the towing vehicle attaches the drawbar to the hitch, he will back up the towing vehicle to position the hitch ball just below the cup. Once in this position, the drawbar is lowered onto the ball by lowering the stand.

Generally it takes a significant amount of experience and skill for the vehicle operator to accurately position the hitch ball below the drawbar cup when backing up the towing vehicle to connect the towed vehicle to the towing vehicle. Regardless of the operator's skill and experience, it is nearly impossible to exactly position the hitch ball at the proper location. Therefore, the operator typically must use the trailer drawbar to manually move the towed vehicle in a right or left or front or back direction to provide the exact alignment. Because the towed vehicle may be large, heavy and cumbersome to move, this is sometimes a difficult task.

Modern vehicles often include one or more cameras that provide back-up assistance, provide images of the road as the vehicle is traveling for collision avoidance purposes, provide structure recognition, such as roadway signs, etc. Camera systems used for vehicle back-up assistance often employ visual overlay graphics that are super-imposed or over-laid on the camera image to provide vehicle back-up steering guidance. For those applications where graphics are overlaid on the camera images, it is critical to accurately calibrate the position and orientation of the camera with respect to the vehicle. Camera calibration typically involves determining a set of parameters that relate camera image coordinates to vehicle coordinates and vice versa. Some camera parameters, such as camera focal length, optical center, etc., are stable, while other parameters, such as camera orientation and position, are not. For example, the height of the camera depends on the load of the vehicle, which will change from time to time. This change can cause overlaid graphics of vehicle trajectory on the camera image to be inaccurate.

U.S. patent application Ser. No. 14/476,345 titled, Smart Tow, filed Sep. 3, 2014, assigned to the assignee of this application and herein incorporated by reference, discloses a system and method for providing visual assistance through a graphic overlay super-imposed on a back-up camera image for assisting a vehicle operator when backing up a vehicle to align a tow hitch ball to a trailer drawbar. The method includes providing camera modeling to correlate the camera image in vehicle coordinates to world coordinates, where the camera modeling provides the graphic overlay to include a tow line having a height in the camera image that is determined by an estimated height of the trailer drawbar. The method also includes providing vehicle dynamic modeling for identifying the motion of the vehicle as it moves around a center of rotation. The method then predicts the path of the vehicle as it is being steered including calculating the center of rotation.

The above described system in the '345 application is effective in providing visual assistance to the vehicle operator when aligning a tow ball to a trailer drawbar. However, that system requires the vehicle operator to actually control the brake, steering and throttle of the vehicle in association with the visual assistance in order to provide the alignment between the tow ball and the drawbar. Thus, there are still some drawbacks because of the operator skill level, where the ability to align the tow hitch ball with the trailer drawbar can be improved upon through a completely autonomous process.

SUMMARY OF THE INVENTION

The present disclosure describes a system and method for autonomously aligning a tow hitch ball on a towing vehicle and a trailer drawbar on a trailer through a human-machine interface (HMI) assisted visual servoing process. The method includes providing rearview images from a rearview camera on the vehicle that show the tow ball and the drawbar, where the images are displayed on a touch screen display. The method includes touching the tow ball on the display to register a location of the tow ball in the image and touching the drawbar on the display to register a location of a target where the tow ball will be properly aligned with the drawbar. The method provides a template pattern around the target on the image and autonomously moves the vehicle so that the tow ball moves towards the target. The method predicts a new location of the target as the vehicle moves and identifies the target in new images as the vehicle moves by comparing the previous template pattern with an image patch around the predicted target location. The method stops the vehicle when the distance from the hitch ball to the target is below some minimum threshold.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for autonomously positioning a vehicle so that a tow hitch ball on the vehicle aligns with a trailer drawbar is merely exemplary in nature, and is in no way intended to limit the invention or its applications or uses. For example, as discussed, the system and method has particular application for autonomously positioning a vehicle so that a tow hitch ball aligns with a trailer drawbar. However, as will be appreciated by those skilled in the art, the system and method may have application for other mobile platforms, such as on trains, machines, tractors, boats, recreation vehicles, etc.

The present invention proposes a system and method for autonomously positioning a vehicle so that a tow hitch ball on the vehicle aligns with a trailer drawbar through an HMI assisted visual servoing procedure. As will be discussed in detail below, the operator will position the vehicle proximate the trailer so that a rearview image from a camera at the back of the vehicle shows the trailer and trailer drawbar. The operator will then through a touch screen showing the image identify the location of the hitch ball in the image, identify a target on the drawbar, and then initiate a command where the vehicle will autonomously move the vehicle so that the hitch ball aligns with target.

Figure 1:
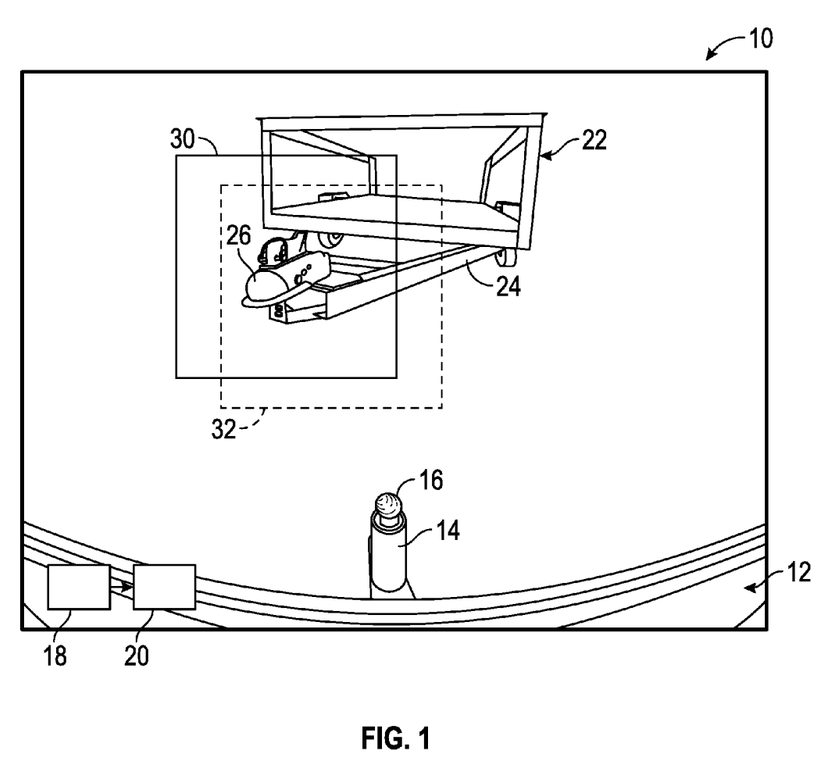
FIG. 1 is an illustration of a camera image showing a vehicle including a tow hitch positioned relative to a trailer including a tow drawbar.

FIG. 1 is an illustration of a rearview camera image 10 provided by a camera mounted to a rear of a vehicle 12, where the vehicle 12 includes a tow hitch 14 having a tow hitch ball 16 extending therefrom. A back-up control system 18 is shown generally on the vehicle 12 and includes all of the cameras, camera image processors, algorithms, autonomous vehicle controllers, etc. required for operation of the invention as discussed below. Box 20 is a touch screen display on the vehicle 12 that the image 10 can be displayed on to allow the vehicle operator to see the image 10 and provide the touch screen inputs as discussed herein. The image 10 shows a trailer 22 behind the vehicle 12 that includes a trailer drawbar 24 having a drawbar cup 26 positioned some distance above the ground and higher than the tow ball 16.

Once the vehicle operator has positioned the vehicle 12 in front of the trailer 22 and the camera image 10 shows the trailer 22, the vehicle operator will register the tow ball 16 by touching the image of the tow ball 16 on the display 20 so as to register the location of the tow ball 16 in the image 10. The process of registering the position of the hitch ball 16 in the image 10 can have previously been performed, where the location of the tow ball 16 in the image 10 should always be at the same location. Next, the operator will identify a target location by touching the cup 26 on the display 20, where the cup 26 is referred to herein as the target. Those skilled in the art will readily recognize suitable algorithms and processes for identifying the location of an element in an image through a touch screen operation. The vehicle operator will then shift the vehicle 12 into reverse, or provide some other suitable command, which is an indication for the system 18 to take over driving the vehicle 12 to position the tow ball 16 at the target location without any further intervention by the vehicle operator. As will be discussed in detail below, as the vehicle 12 moves and the position of the target changes in the image 10, the target is tracked and locked to identify a new position of the target. The distance between the hitch ball 16 and the target is calculated each time a new image is provided, and once the distance between the hitch ball 16 and the target is within some minimum threshold, such as one inch, the vehicle 12 is stopped, and the autonomous alignment process is finished, where the vehicle operator then must lower the drawbar 24 so that the hitch ball 16 is positioned within the cup 26. During the alignment maneuver, the vehicle operator will monitor surrounding objects, such as people or animals, which will allow the vehicle operator to abort the automatic hitch alignment maneuver if a collision path exists by touching the brake or providing vehicle steering.

Figure 2:
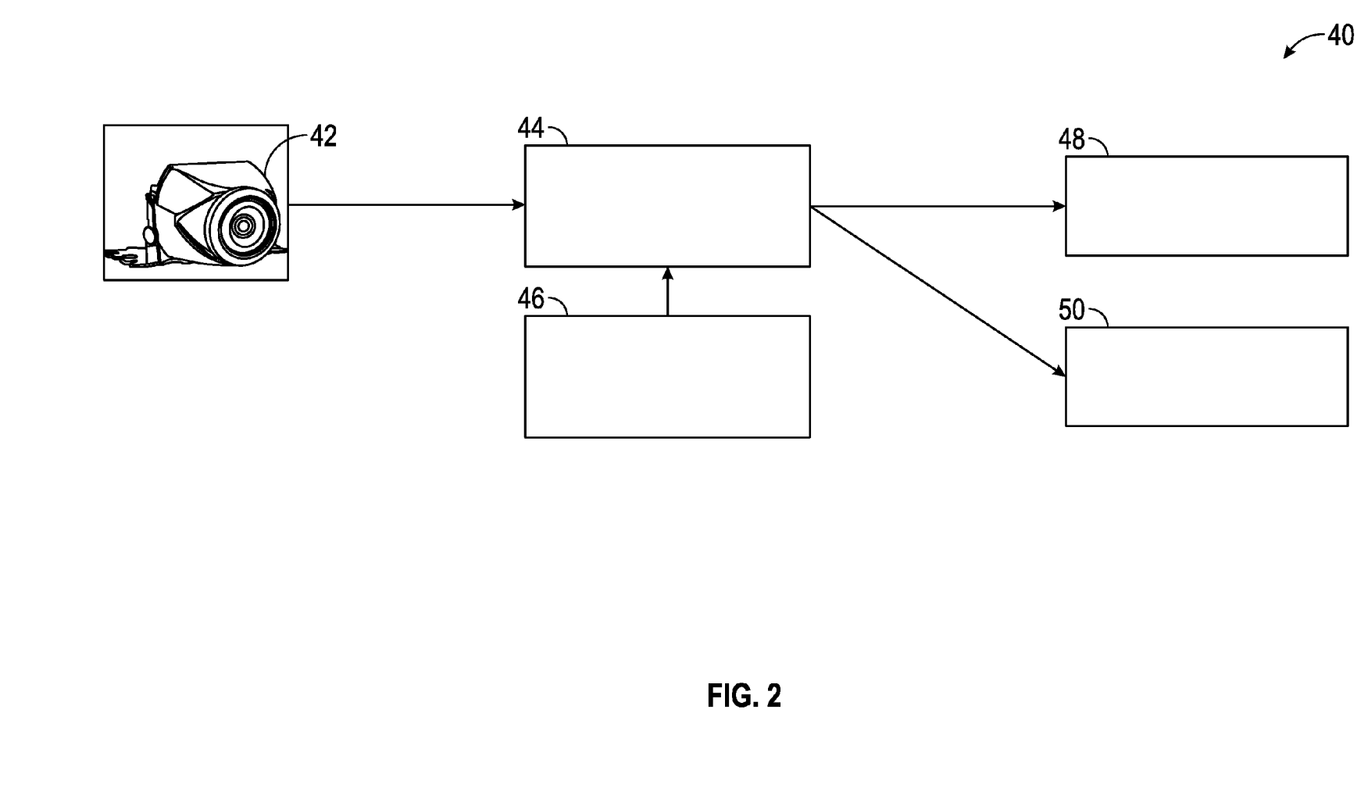
FIG. 2 is a schematic block diagram of a system for automatically positioning the vehicle to align a tow hitch ball with the tow drawbar.

FIG. 2 is a high-level schematic block diagram of a system 40 that autonomously positions the vehicle 12 during the back-up and hitch alignment maneuver as described herein. The system 40 includes a rearview camera 42 that provides images at a predetermined sample rate to a visual servoing controller 44 that controls the position of the vehicle 12 during the maneuver using feedback analysis. Additionally, human-machine interface (HMI) inputs are provided at box 46 to the controller 44 through the touch screen display 20 as described above. Although use of the touch screen display 20 is employed in the embodiments discussed herein, other techniques may be available to identify the location of the hitch ball 16 and the target in the image 10. Once the tow ball 16 and the target have been identified and registered by the HMI input, and the vehicle operator initiates the alignment maneuver, the controller 44 will provide throttle and brake command signals to an engine control module (ECM) 48 to move the vehicle 12 at the desired speed towards the trailer 22 and steering angle command signals to an electric power steering (EPS) control module 50 with torque overlay to provide vehicle steering for the maneuver. As the vehicle 12 moves, the location of the target in the image 10 also moves, where the controller 44 recalculates the new position of the target from the new images consistent with the discussion herein. As the vehicle 12 continues to move towards the target and the location of the target in the image 10 is continually updated, the controller 44 attempts to minimize the distance between the tow ball 16 and the target so that when they are at the same location, the process stops, which should locate the tow ball 16 directly below the cup 26.

When the target is initially registered, the system 40 identifies the target location in image coordinates (u,v) and provides a target pattern or template T around the target, shown as template 30 in FIG. 1, defined by, for example, a pixel array or feature descriptor, that is some portion of the image 10 that includes the target. Once the target location has been identified and the system 40 has been engaged, the target is tracked and locked as the vehicle 12 moves to align the hitch ball 16 and the target. Based on the speed and the steering angle of the vehicle 12, the algorithm predicts a new location (u',v') in image coordinates of the target at each sample point. When a new image is acquired from the camera 42, the algorithm searches the new image around the predicted location (u',v') within a predefined window W, defined as an image patch I(u,v), and represented as dotted box 32 in FIG. 1, using equations (1) and (2) below.

$$\min_{u,v} \|T - I(u,v)\|^2, \quad (1)$$

where:

$$\min(|u-u'|, |v-v'|) < W. \quad (2)$$

When an image match to the template 30 is found in the window 32, the algorithm replaces the current template 30 represented by T with the new matched template T, where the new location (u',v') of the target becomes the current location (u,v) of the target. The algorithm repeats the process above when a new image is acquired. The old templates T can be discarded, or an averaging process can be employed where some number of the old template T are retained as the vehicle 12 moves.

Figure 3:
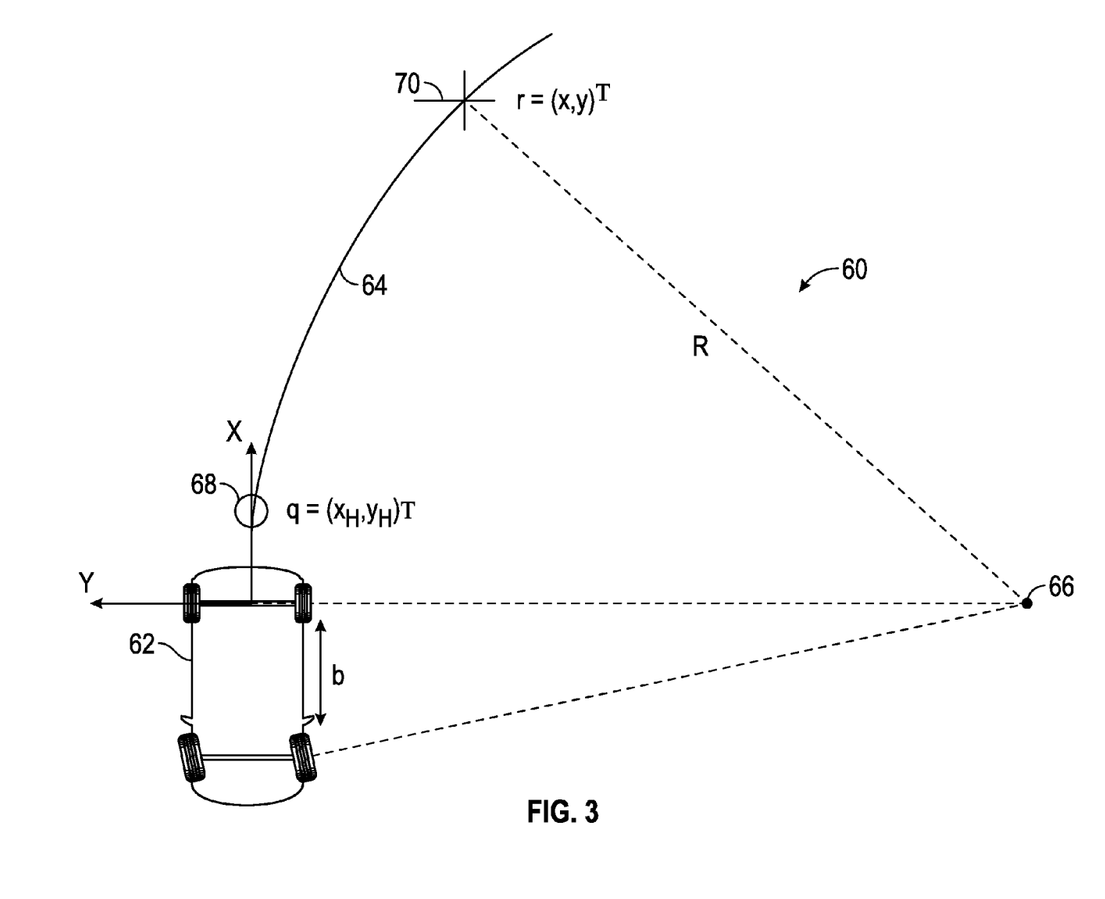
FIG. 3 is an illustration showing a top-down view of a vehicle moving along a steering path showing variable for conversion of image coordinates to world coordinates.

As mentioned, the controller 44 controls the steering angle of the vehicle 12, which is converted to a road wheel angle θ. In one embodiment, the algorithm provides open-loop control to calculate the steering angle to minimize the distance between the position of the tow ball 16 and the target. To do this, the algorithm needs to convert the image coordinates (u,v) in the image 10 to world coordinates (x,y). FIG. 3 is a top-down view illustration 60 of a vehicle 62 having a wheel base b, where the vehicle 62 is turning along a curve 64 relative to a turning point 66, and where circle 68 represents the location of the tow ball 16 and plus sign 70 represents the target location. The location of the hitch ball 16 in world coordinates is identified as $q=(x_H, y_H)^T$ and the location of the target in world coordinates is identified as $r=(x, y)^T$. The algorithm maps each pixel position (u,v) in the image 10 to the top-down view in x-y world coordinates. Particularly, a homography matrix H maps a pixel as $u=(u, v, 1)^T$ to an x-y plane that is parallel to the ground at the same height as the tow ball 16 as follows.

$$p=(p_1,p_2,p_3)^T, \quad (3)$$

$$p=Hu, \quad (4)$$

$$x=p_1/p_3, \quad (5)$$

$$y=p_2/p_3, \quad (6)$$

where the homography matrix H is defined as:

$$H = Kc\left(Rot + \frac{tn^T}{d}\right)K^{-1}, \quad (7)$$

and where Kc is an intrinsic matrix, Rot is the camera rotation matrix, t is the camera center, d is the height of the tow ball 16, and:

$$n^T X = d, \quad (8)$$

is the plane equation. Once the camera 42 has been calibrated, the intrinsic matrix Kc, the camera rotation matrix Rot and the camera center t are known values.

If the distance between the hitch ball location q and the drawbar location r is within a predetermined threshold, the algorithm stops and holds the vehicle 12 because the hitch ball 16 is at the target location. If the distance between the hitch ball location q and the drawbar location r is not within the predetermined threshold, the algorithm calculates the desired steering wheel angle to steer the vehicle 12 to the target location as:

$$R = \frac{x^2 + y^2}{2y} \quad (9)$$

$$\theta = \tan^{-1}\left(\frac{b}{R}\right). \quad (10)$$

For the initial step, the algorithm holds the vehicle 12 at full brake, and moves the steering wheel to the desired steering wheel angle, otherwise it releases the brake and controls the vehicle speed v while servoing the steering wheel angle.

Figure 4:
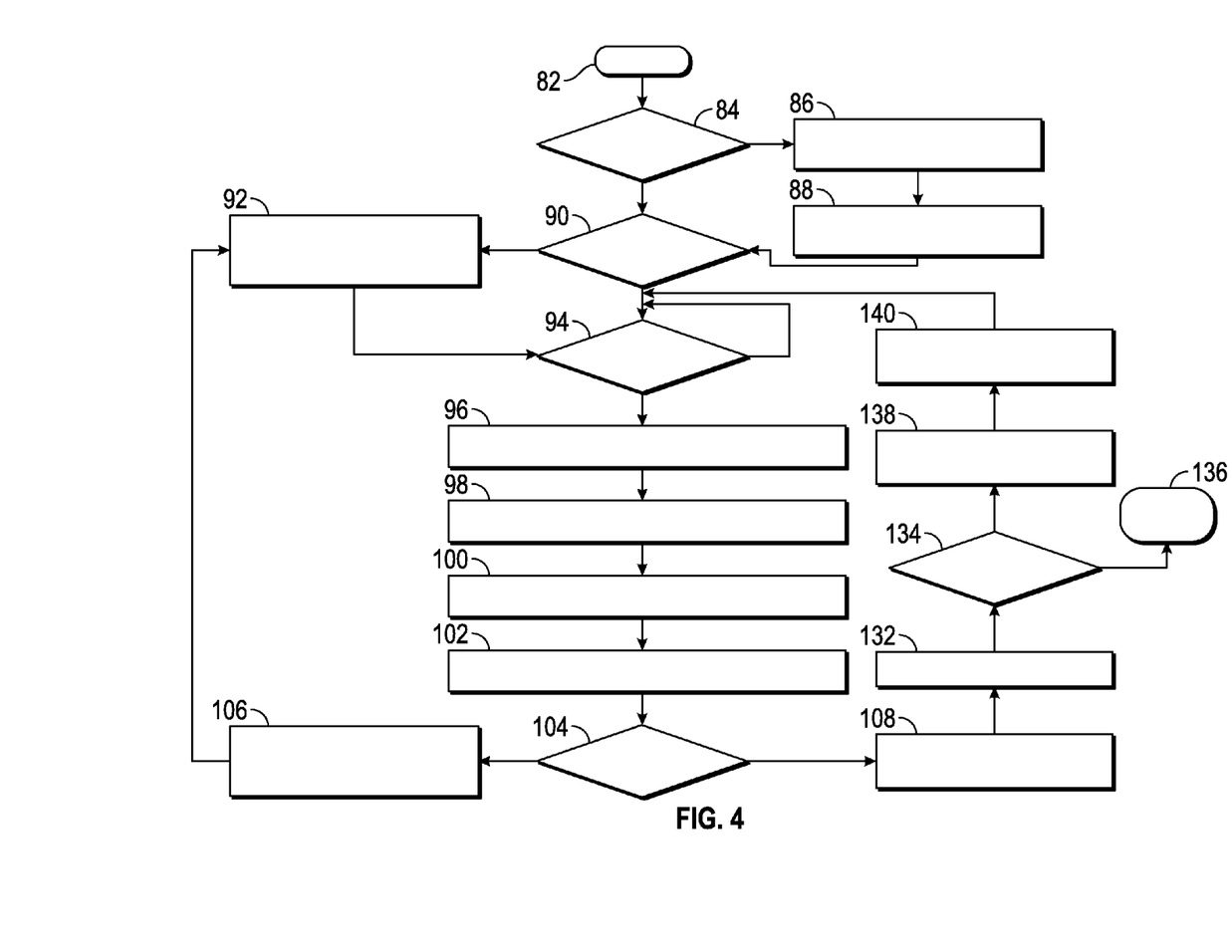
FIG. 4 is a flow chart diagram showing a process for autonomously positioning the tow ball through an HMI assisted visual servoing process.

FIG. 4 is a flow chart diagram 80 showing a process for autonomously steering the vehicle 12 so that the tow ball 16 is aligned with the target as discussed above. The algorithm starts at box 82, and determines if the tow ball 16 is registered at decision diamond 84. If the tow ball 16 is not registered at the decision diamond 84, then the algorithm prompts the vehicle operator to identify the location of the tow ball 16 in the image 10 by touching the display 26 at box 86, as discussed above, and the algorithm then registers and stores the location of the tow ball 16 in image coordinates at box 88. Once the algorithm has registered the location of the tow ball 16 at the box 88 or the location of the tow ball 16 has been previously registered at the decision diamond 84, the algorithm then determines whether a target in the image 10 has been identified at decision diamond 90. If this is the beginning of the operation for aligning the tow ball 16 to the target, then the target will not have been identified at the decision diamond 90, and the process will move to box 92, where the vehicle operator will identify the location of the target on the image 10 as discussed above. The algorithm also defines the template 30 around the target at the box 92.

If the target has been identified at the decision diamond 90 or the new target has been identified at the box 92, the algorithm determines whether a new image has been obtained from the camera 42 at decision diamond 94. The new image could be the original image before the algorithm has moved the vehicle 12 towards the target at the beginning of the alignment maneuver or could be a new image obtained while the vehicle 12 is in the hitch alignment maneuver. If a new image has been obtained at the decision diamond 94, the algorithm then estimates the speed of the vehicle 12, the steering angle of the vehicle 12, yaw rate of the vehicle 12, the hitch trajectory, etc. at box 96 to move the vehicle towards the target. The algorithm provides image rectification at box 98 to remove distortions in the most recent image in a manner well understood by those skilled in the art. The algorithm then rescales or repositions the image patch 32 and predicts the target location (u',v') in the new image at box 100 using the estimated speed of the vehicle 12, the steering angle of the vehicle 12, the yaw rate of the vehicle 12, the hitch trajectory, etc. The algorithm then performs a pattern matching operation within the image patch 32 at box 102 to identify the template 30 in the new window. The algorithm then determines whether a match between the current template T and a template in the image patch 32 has been found at decision diamond 104, and if not, aborts the process at box 106 by stopping the vehicle 12, and returns to the box 92 to have the vehicle operator input the target location again. If a match to the current template T has been found in the rescaled image patch 32 at the decision diamond 104, then the algorithm estimates the target position in the new image using, for example, a Kalman-Bucy filtering process at box 108.

Figure 5:
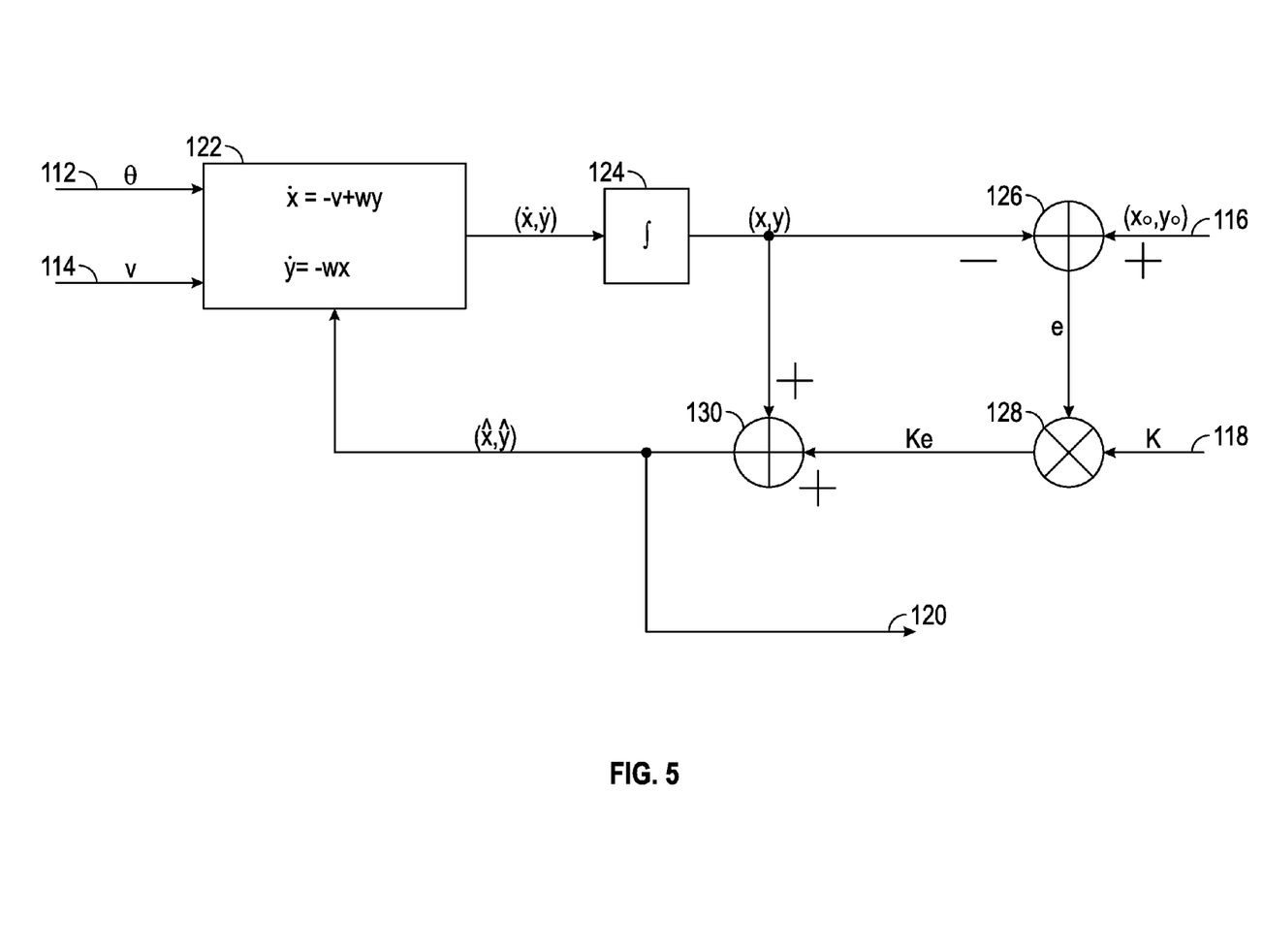
FIG. 5 is a schematic block diagram of a system for providing Kalman-Bucy filtering for estimating the position of the drawbar in the process for autonomously positioning the tow ball.

FIG. 5 is a block diagram of a system 110 showing an example of one process for determining the target position in the new image using the Kalman-Bucy filtering process. The system 110 has four inputs, namely, the road wheel angle θ on line 112, the vehicle speed v on line 114, a measurement $(x_0,y_0)$ of the position of the drawbar location p in the image plane on line 116, and a Kalman filter gain K on line 118. The estimated position $(\hat{x}, \hat{y})$ of the target is provided as an output on line 120. Using the road wheel angle θ, the vehicle speed v, and the estimate of the target position $(\hat{x}, \hat{y})$ from a previous calculation, the time derivative of the position of the target $(\dot{x}, \dot{y})$ is determined at box 122 as:

$$\dot{x} = -v + \omega y, \quad (11)$$

$$\dot{y} = -\omega x, \quad (12)$$

where:

$$\omega = \frac{\tan \theta}{b} v. \quad (13)$$

The time derivative of the position of the target $(\dot{x}, \dot{y})$ is integrated at box 124 to generate the target location in world coordinates (x,y). The target location (x,y) is subtracted from the measurement $(x_0, y_0)$ of the position of the drawbar location p in a subtractor 126 to generate an innovation error e, which is multiplied by the Kalman gain K in a multiplier 128. The gain adjusted error signal Ke is then added to the target location (x,y) in an adder 130 to provide the estimated position of the target $(\hat{x}, \hat{y})$ on the line 120.

Returning to the flow chart diagram 80, once the position of the target is obtained at the box 108 as discussed above, the algorithm then computes the distance from the hitch ball 16 to the target at box 132, and determines whether that distance is less than some predetermined threshold at decision diamond 134. If the distance is less than the threshold at the decision diamond 134, then the algorithm knows that the tow ball 16 is aligned with the target, and the brakes are applied to stop the vehicle at box 136. If the distance is not less than the threshold at the decision diamond 134, then the algorithm computes the desired steering angle and the vehicle speed v at box 138, and provides those signals to the control modules 48 and 50 to move the vehicle 12 to reduce the distance between the tow ball 16 and the target at box 140. The algorithm then returns to the decision diamond 94 to determine whether a new image has arrived.

As will be well understood by those skilled in the art, the several and various steps and processes that may have been discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for autonomously aligning a hitch tow ball attached to a back of a towing vehicle with a drawbar attached to a trailer, said method comprising:
   providing rearview images from a rearview camera on the vehicle that show the tow ball and the drawbar;
   displaying the images on a touch screen display;
   touching the tow ball on the display to register a position of the tow ball in the image;
   touching the drawbar on the display to register a position of a target where the tow ball will be aligned with the drawbar;
   providing, by a controller including a processor and memory, a template pattern around the registered target in the image;
   autonomously moving the vehicle, by the controller, so that the tow ball moves towards the target;
   predicting, by the controller, a position of the target in new images as the vehicle moves, using vehicle speed, vehicle steering angle and hitch trajectory;
   estimating, by the controller, a new location of the target in the new images as the vehicle moves by comparing the template pattern with an image patch window provided around the predicted position of the target;
   determining, by the controller, a distance between the tow ball and the new location of the target; and
   stopping the vehicle, by the controller, when the distance between the tow ball and the new location of the target is less than a predetermined threshold.

2. The method according to claim 1 wherein autonomously moving the vehicle includes autonomously providing vehicle brake, throttle and steering commands.

3. The method according to claim 1 wherein autonomously moving the vehicle includes recalculating vehicle speed and steering based on the new location of the target.

4. The method according to claim 1 wherein autonomously moving the vehicle includes autonomously steering the vehicle, and wherein steering the vehicle includes converting image coordinates of the position of the tow ball and the target to world coordinates.

5. The method according to claim 4 wherein converting image coordinates of the position of the tow ball and the target to world coordinates includes using a homography matrix.

6. The method according to claim 1 wherein estimating a new location of the target in the new images includes matching the template pattern to a same pattern in the window.

7. The method according to claim 1 wherein estimating a new location of the target includes employing a Kalman-Bucy filtering process.

8. The method according to claim 7 wherein the Kalman-Bucy filtering process uses a road wheel angle input, a vehicle speed input, a Kalman gain value, and a measurement of the position of the target.

9. The method according to claim 1 further comprising providing image rectification of new images as they are obtained.

10. The method according to claim 1 further comprising initiating the alignment maneuver after the target has been registered by putting the vehicle in a reverse gear.

11. A method for autonomously aligning a hitch tow ball attached to a back of a towing vehicle with a drawbar attached to a trailer, said method comprising:
    providing rearview images from a rearview camera on the vehicle that show the tow ball and the drawbar;
    registering a position of the tow ball in the image;
    registering a position of a target where the tow ball will be aligned with the drawbar;
    autonomously moving the vehicle, by a controller including a processor and memory, so that the tow ball moves towards the target;
    determining, by the controller, a distance between the tow ball and a new location of the target; and stopping the vehicle, by the controller, when the distance between the tow ball and the new location of the target is less than a predetermined threshold.

12. The method according to claim 11 further comprising providing by the controller a template pattern around the registered target in the image, predicting by the controller a position of the target in new images as the vehicle moves using vehicle speed, vehicle steering angle and hitch trajectory, and estimating by the controller the new location of the target in the new images as the vehicle moves by comparing the template pattern with an image patch window provided around the predicted position of the target.

13. The method according to claim 12 wherein estimating the new location of the target in the new images includes matching the template pattern to a same pattern in the window.

14. The method according to claim 11 wherein autonomously moving the vehicle includes autonomously steering the vehicle, and wherein steering the vehicle includes converting image coordinates of the position of the tow ball and the target to world coordinates.

15. A system for autonomously aligning a hitch tow ball attached to a back of a towing vehicle with a drawbar attached to a trailer, said system comprising:
   a rearview camera on the vehicle for providing rearview images that show the tow ball and the drawbar;
   a touch screen display for displaying the images;
   means for touching the tow ball on the display to register a position of the tow ball in the image;
   means for touching the drawbar on the display to register a position of a target where the tow ball will be aligned with the drawbar; and
   a controller including a processor and memory, said controller configured for;
   providing a template pattern around the target in the image;
   autonomously moving the vehicle so that the tow ball moves towards the target;
   predicting a position of the target in new images as the vehicle moves;
   estimating a new location of the target in the new images as the vehicle moves by comparing the template pattern with an image patch window provided around the predicted position of the target;
   determining a distance between the tow ball and the new location of the target; and
   stopping the vehicle when the distance between the tow ball and the new location of the target is less than a predetermined threshold.

16. The system according to claim 15 wherein the controller autonomously steers the vehicle, and wherein steering the vehicle includes converting image coordinates of the position of the tow ball and the target to world coordinates.

17. The system according to claim 16 wherein converting image coordinates of the position of the tow ball and the target to world coordinates includes using a homography matrix.

18. The system according to claim 15 wherein estimating a new location of the target employs a Kalman-Bucy filtering process.

19. The system according to claim 18 wherein the Kalman-Bucy filtering process uses a road wheel angle input, a vehicle speed input, a Kalman gain value, and a measurement of the position of the target.

* * * * *